United States Patent [19]

Ofverberg

[11] 4,024,540
[45] May 17, 1977

[54] CONTINUOUS WAVE FM TONE RANGING RADAR WITH PREDETECTION AVERAGING

[75] Inventor: Mats Jorgen Ofverberg, Sunnyvale, Calif.

[73] Assignee: Cincinnati Electronics Corporation, Cincinnati, Ohio

[22] Filed: Mar. 12, 1976

[21] Appl. No.: 666,526

[52] U.S. Cl. ..................................... 343/14; 343/9
[51] Int. Cl.² ........................................ G01S 9/24
[58] Field of Search ................................ 343/9, 14

[56] References Cited
OTHER PUBLICATIONS

Introduction to Radar Systems, M. I. Skolnik, McGraw-Hill, 1962, Chapt. 3, pp. 89–90.

Primary Examiner—Richard A. Farley
Assistant Examiner—Richard E. Berger
Attorney, Agent, or Firm—Lowe, King, Price & Markva

[57] ABSTRACT

A CW FM TR radar receiver responsive to a local tone modulation source and a return signal having a carrier frequency modulated by the tone is particularly adapted to handle a return signal containing different returns derived from multiple targets and/or via multipath. An FM demodulator responds to the return signal to derive a demodulated signal containing the tone frequency. The demodulated tone frequency signal is averaged over a time interval of many cycles of the tone. The phases of the average tone frequency component and the tone of the local modulation source are compared to enable an indication of the range and velocity of a dominant target contributing to the return signal to be derived.

10 Claims, 5 Drawing Figures

CONTINUOUS WAVE FM TONE RANGING RADAR WITH PREDETECTION AVERAGING

FIELD OF INVENTION

The present invention relates generally to continuous wave frequency modulated tone ranging radar (hereafter CW FM TR radar) and more particularly to a CW FM TR radar receiver wherein a return signal is averaged prior to being phase detected.

BACKGROUND OF THE INVENTION

Conventional CW FM TR radars are generally limited to applications wherein a return signal is adapted to contain information regarding only one target. In other words, CW FM TR radars have not been designed for applications wherein a return signal may contain different returns derived from multiple targets and/or via multipath, i.e., transmission from a single target to a receiver via a direct path, as well as via reflected paths. This limitation arises because the multiple, different returns arrive at the receiver at different times, with different frequency and amplitude components to produce a composite return signal simultaneously containing many different components that have not been easily separated using conventional prior art techniques; see *Introduction To Radar Systems*, written by M. I. Skolnik, published by McGraw-Hill in 1962, chapter 3, pages 89 and 90.

In the typical prior art CW FM TR radar, the return signal is demodulated to derive a replica of the modulation imposed on the return signal. The demodulated signal is a function of the amplitude and carrier and modulation phases of the several different returns that form the composite return signal. Unless one of the individual returns has an amplitude considerably in excess of all of the remaining returns (at least an order of magnitude greater), the demodulated signal is likely to have a phase component that cannot be associated with any particular return. Hence, a phase comparison of the detected, demodulated signal with the original modulation for a transmitted signal may not provide any significant information regarding any of the returns. A theoretical basis for the inaccuracies inherent in the prior art CW FM TR radars using a low modulation index is provided in my Doctor of Philosophy thesis entitled "Multiple Target Resolution in a CW-FM Tone Ranging System" submitted to the Department of Electrical Engineering, University of Cincinnati, in July 1975.

While CW FM TR radars employing a high modulation index have been proposed in order to reduce the problems associated with a return signal being responsive to multiple returns, these systems have certain theoretical and practical disadvantages. In particular, in the proposed radar no consideration is given to the average range error when there is relative movement between the different targets, in which case there is a variation in the phases of the carrier frequency components on the separate returns forming the composite return. Of course, a wide band FM system requires a wide band signal structure and the associated difficulties in designing a highly sensitive, wide band receiver. A low modulation index radar, on the other hand, has great appeal because of the availability of efficient carrier loop implementations.

BRIEF DESCRIPTION OF THE INVENTION

In accordance with the present invention, the problems inherent in the prior art low modulation index CW FM TR radars responsive to multiple returns are eliminated by averaging the phase of the demodulated signal over many cycles, prior to the demodulated signal being phase compared. The averaged, demodulated signal is shown in my thesis to contain information regarding only a dominant return in the composite return. In particular, if the dominant return has a signal amplitude larger than the sum of the amplitudes of the other returns, i.e., interfering targets, the averaged demodulated signal has a phase position indicative only of the dominant return and therefore of the position and velocity of a desired target. The average phase value corresponds closely to the phase of a dominant signal if the averaging time is selected such that the differences in carrier phase between the different returns are varied over several cycles. The resulting modulation component then is approximated by:

$$m\, e^{j\omega_m(t-\tau_1)} \tag{1}$$

where:
 $m$ = the modulation index imposed by the tone on the carrier,
 $\omega_m$ = angular frequency of the modulating tone,
 $t$ = time,
 $\tau_1$ = total propagation delay for the phase component of the dominant signal,
 $j = \sqrt{-1}$
 $e$ = base of natural logarithms.

In order to enable a determination of the position and velocity of the dominant return to be ascertained, the averaged, demodulated return signal is phase compared with the original transmitted radar tone. The averaged tone component is preferably derived by integrating the demodulated return signal over a period including many cycles of the carrier phase differences. The average phase of the demodulated return is determined over the period and converted into a DC value that remains constant over the period. The DC value modulates a tone frequency source to produce a constant amplitude and phase wave at the frequency of the tone source. The constant amplitude and phase wave is compared with the originally transmitted modulation tone.

It is to be understood that other techniques can be used to derive an indication of the average phase of the return signal over the relatively long time interval. For example, a very narrow band filter having a center frequency at the modulation tone frequency can serve as the averaging device. The disadvantage of this approach is that a long averaging interval requires a very narrow bandwidth filter. In such an instance, small variations in the filter components, which can result in drift of the filter center frequency, may introduce phase shifts between the filter input and output signals. Hence, any uncertainty at a given time in filter phase shift is reflected as an error in the measured modulation phase. The narrow band filter approach is thus not practical in most cases, but is mentioned here specifically to clarify why a very narrow band filter is not generally used between the demodulator and phase detector in the conventional, prior art systems.

It is, accordingly, an object of the present invention to provide a new and improved CW FM TR radar particularly adapted to process a return signal having multiple returns imposed thereon.

Another object of the invention is to provide a new and improved low modulation index CW FM TR radar receiver that does not require complex and sensitive or highly precise circuitry in order to process a return signal containing returns from several apparent sources.

An additional object of the invention is to provide a low modulation index CW FM TR radar receiver employing predetection averaging.

The above and still further objects, features and advantages of the present invention will become apparent upon consideration of the following detailed description of several specific embodiments thereof, especially when taken in conjunction with the accompanying drawing.

DETAILED DESCRIPTION OF THE DRAWING

Figure 1:
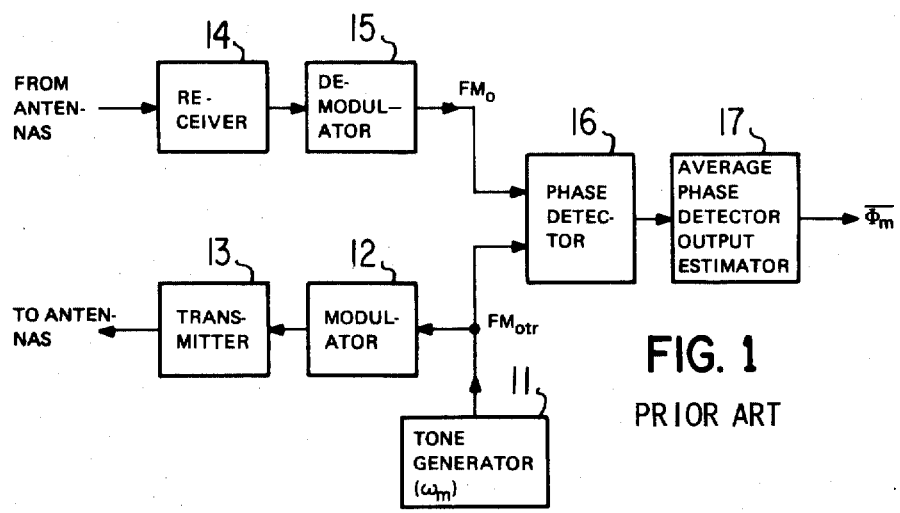
FIG. 1 is a block diagram of a typical prior art low modulation index CW FM TR radar.

Reference is now made to FIG. 1 of the drawing wherein a conventional CW FM TR radar is schematically illustrated as including a single frequency tone generator 11 having a constant frequency (designated as angular frequency $\omega_m$) on the order of 1 KHz. The output of tone generator 11 is applied to a frequency or phase modulator 12 that drives CW FM radar transmitter 13. The carrier frequency of transmitter 13 is typically on the order of 300 MHz and is periodically varied at the frequency of generator 11 with a relatively low modulation index so that the carrier is typically deviated over a range on the order of less than 1 kHz.

The signal derived from transmitter 13 is propagated to a target and returned to CW FM TR radar receiver 14. To prevent ambiguity the return signal occurs during the same cycle of tone generator 11 as the transmitted signal by selecting the frequency of the tone generator to be sufficienty low, in the region mentioned. However, the presented concept is valid also for higher modulation frequencies that can be, and are, used to obtain higher accuracy resolution. The return signal can be derived either from passive targets or from active targets, i.e., targets including transponders. In the former case the return signal is modulated on the same carrier frequency as the transmitted signal, while in the latter case the return signal carrier frequency is displaced from the transmitted frequency. The return signal derived by receiver 14 is coupled to demodulator 15 which derives an output signal having approximately the same frequency as the frequency of tone generator 11.

If the return signal coupled to receiver 14 contains a single return, i.e., the return from a single target, the output signal of demodulator 15 is shifted in phase from the phase of tone generator 11 by an amount directly proportional to the total propagation time from transmitter 13 to the target and back to receiver 14. If the target has a velocity component relative to the radar the frequency derived from demodulator 15 is shifted from the frequency of tone generator 11 by an amount directly proportional to this velocity. Hence, by comparing the phase of the output of demodulator 15 and tone generator 11 in phase detector 16 an indication is derived of the range and velocity of the target relative to the radar. The phase indicating output of detector 16 is coupled to averaging network 17 that derives an output signal indicative of the average phase difference between the outputs of generator 11 and demodulator 15 over several cycles of tone generator 11 so that an indication is provided of the average range of a target.

While the prior art system illustrated in FIG. 1 functions admirably for a return signal including only one return, it may not perform satisfactorily if there are multiple returns on the return signal unless one of the returns is much stronger (at least an order of magnitude difference in amplitude) than all of the other returns combined. In particular, if there are multiple returns forming the return signal coupled to receiver 14, and the several returns are on the same order of magnitude, the output signal of demodulator 15 is indicative of the vector sum of the several returns. Thereby, the phase of the output of demodulator 15 does not contain any significant information regarding any of the separate returns. It is to be understood that the several returns can be derived either from multiple targets, or from a single target that is coupled via a direct path and via at least one reflected path (multipath) to the receiver. It can be shown that the weighting factor $\alpha_p$ associated with any particular return P on the output of demodulator 15 can be represented as:

$$\alpha_p = \frac{\epsilon_p}{\epsilon_o} \cos(\phi_p - \phi_o) \tag{2}$$

where:

$\epsilon_p$ = the amplitude of the return for target P;
$\epsilon_o$ = the vectorial sum of the amplitudes of all of the returns;
$\phi_p$ = the carrier phase of return P; and
$\phi_o$ = the carrier phase resulting from the vector sum of the several returns received by receiver 14.

It can also be shown that in a situation wherein the return signal to receiver 14 includes two returns, designated as 1 and 2, the weighting factor for return 1 can be represented as:

$$\alpha_1 = \frac{1 + \frac{\epsilon_2}{\epsilon_1} \cos(\phi_1 - \phi_2)}{1 + \left(\frac{\epsilon_2}{\epsilon_1}\right)^2 + 2\frac{\epsilon_2}{\epsilon_1} \cos(\phi_1 - \phi_2)} \tag{3}$$

where:

$\alpha_1$ = the weighting factor for return 1;
$\epsilon_1$ = the amplitude of return 1;
$\epsilon_2$ = the amplitude of return 2;
$\phi_1$ = the carrier phase of return 1; and
$\phi_2$ = the carrier phase for return 2.

From Equation (3), it is seen that the phase of the output of demodulator 15 is a function of the amplitude, carrier and modulation phases of the two returns and that the output of the demodulator cannot be compared with the output of tone generator 11 to derive meaningful information regarding only one of the targets, unless the amplitude of one of the returns is much greater than the amplitude of the other return for many relative phase positions for the two returns. In particular, the output of phase demodulator 15 for the two-target situation is phase displaced from the phase that would occur for only one target as indicated by:

$$\Delta\Phi_m = -\arctan \frac{(1 - \alpha_1) \sin \omega_m (\tau_2 - \tau_1)}{\alpha_1 + (1 - \alpha_1) \cos \omega_m (\tau_2 - \tau_1)} \quad (4)$$

where:
$\Delta\phi_m$ = the phase displacement;
$\tau_1$ = the propagation delay from the transmitter 13 to receiver 14 of target 1, in seconds; and
$\tau_2$ = the propagation delay for target 2, in seconds.

Figure 2:
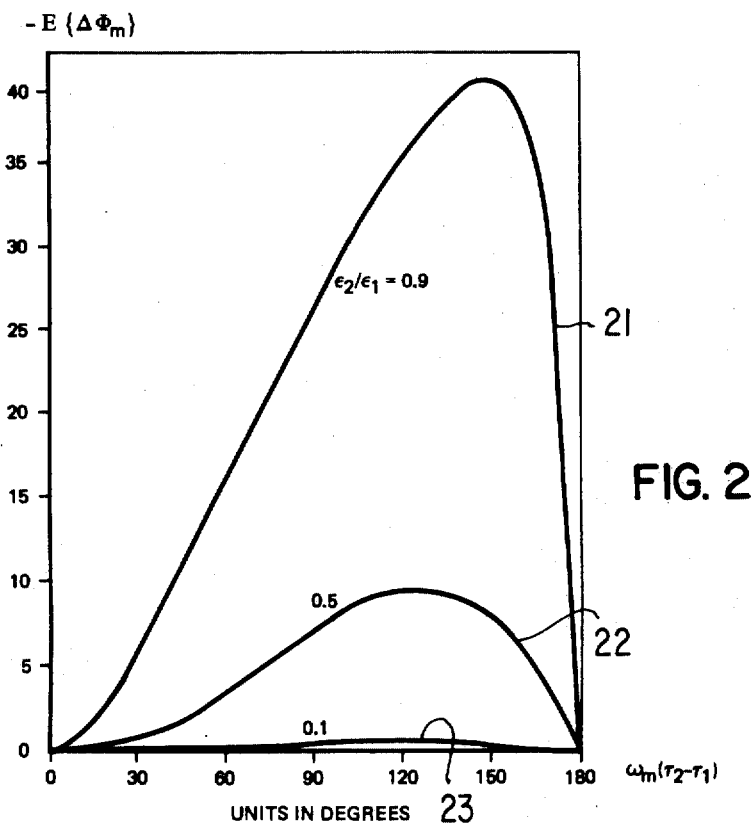
FIG. 2 is a plot indicating the average phase error of the prior art device as a function of the relative amplitude and phase of a dominant and interfering target with the system of FIG. 1.

Averaging the output of the demodulator 15, after phase comparing that output with the phase of tone generator 11, does not rectify the matter. In particular, FIG. 2 indicates the average phase error derived from averaging network 17 for three relative amplitudes of returns 1 and 2, over a gamut of 180° phase displacement for the two returns. In particular, it is noted that if the amplitude of return 2 is nine-tenths that of return 1, as indicated by curve 21, and the phase displacement for the two returns is approximately 145°, and 40° phase error is derived from the output of averaging network 17 with regard to the phase of return 1. Even if the return of target 1 is twice as large as the return for target 2, as indicated by curve 22, there is a ten degree phase error at the output of averaging network 17 when there is a 120° phase displacement between returns 1 and 2. The error can be considered as insignificant only when there is no more than an order of magnitude difference between the amplitudes of returns 1 and 2, as indicated by curve 23, wherein there is a phase error output of averaging network 17 of approximately 1° for the returns displaced by approximately 120°.

Figure 3:
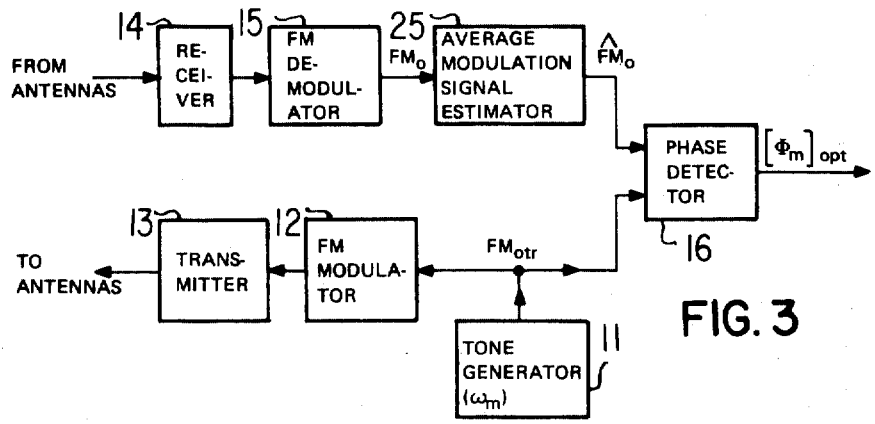
FIG. 3 is a block diagram of the present invention.

In accordance with the present invention, the prior art system of FIG. 1 is modified in the manner illustrated by FIG. 3. FIG. 3 differs from FIG. 1 by providing an average modulation signal estimator network 25 that is connected between the output of FM demodulator 15 and phase detector 16. Network 25 responds to the output of demodulator 15 over many cycles of tone generator 11; in one particular embodiment, network 25 responds to 1,000 cycles of tone generator 11 and has an averaging time on the order of one second. The output signal of average modulation signal estimator network 25 has the same frequency as tone generator 11 and a phase responsive solely to the phase of a return having an amplitude greater than the sum of all of the other returns. Hence, for all situations wherein the return signal to receiver 14 is composed of only two unequal returns, the output signal of network 15 contains information regarding only the return having the highest amplitude. It is shown in my thesis that averaging the output of modulator 15 in network 25 prior to comparing the phase angle of the demodulator output 15 with tone generator 11 in phase detector 16 when the carrier phase differences associated with the various returns vary sufficiently over the averaging time of network 25 results in an average modulation component derived from the network that approaches $m \, e^{j\omega_m(t-\tau_1)}$, provided the amplitude of one return exceeds the sum of the amplitudes of all of the other returns. In other words, the phase of the output of network 25 is responsive solely to the one return.

Preferably, average modulation signal estimator 25 derives an output signal having an angular frequency $\omega_m$ and a phase and amplitude represented by:

$$\widehat{FM_o} = 2 \overline{FM_o \cos \omega_m t} \cos \omega_m t + 2 \overline{FM_o \sin \omega_m t} \sin \omega_m t \quad (5)$$

where:
$\widehat{FM_o}$ = the output of network 25;
$FM_o$ = the output of demodulator 15, and the bar indicates that the quantity is averaged over the averaging time of network 25.

The output of demodulator 15 is a variable phase signal dependent upon the phase $\phi_m$ of the received FM modulation return signal that contains modulation frequency, $\omega_m$, of tone generator 11; demodulator 15 output is thereby represented as:

$$FM_o = m(t) \cos \phi_m (t) \cos \omega_m t - m(t) \sin \phi_m (t) \sin \omega_m t \quad (6)$$

where:
$m(t)$ = the amplitude of the return signal.

By substituting Equation (6) into Equation (5) and by suitable manipulation, it can be shown that the phase difference between the output of network 25 and tone generator 11 is:

$$[\Phi_m]_{opt.} = \arctan \left[ \frac{\overline{m(t) \sin \Phi_m(t)}}{\overline{m(t) \cos \Phi_m(t)}} \right] \quad (7)$$

$$+ \begin{cases} 0 \text{ for } \overline{m(t) \cos \Phi_m(t)} > 0 \\ -\pi \text{ for } \overline{m(t) \cos \Phi_m(t)} < 0 \end{cases}$$

It can be shown that if the change in carrier phase of the two returns is much greater than 360° over the averaging interval of network 25, the average weighting factor of the higher amplitude return, in a two-return situation, is approximately one and that the average weighting factor of the lower amplitude return is approximately zero. If the change in carrier phase between the two targets is an integral multiple of 360°, it can be shown that the average weighting factors of returns 1 and 2 are exactly one and zero. It is possible to adjust the averaging time of estimator 25 on an adaptive basis by observing the periodicity of the output of demodulator 15. If a fixed time averaging network is employed there is not a significant error. The required change in carrier phase differences for static targets can be accomplished by linearly sweeping the transmitted frequency. For example, if $\epsilon_2/\epsilon_1 = 0.9$ and the frequency sweep of transmitter 13 is 100 kHz, the maximum range error is 0.28 nautical miles. With the prior art system using a 1 kHz ranging tone under the same conditions, the maximum range error is approximately 14 nautical miles, approximately 50 times larger than the error with the present invention.

Basically, in a preferred embodiment, network 25 derives a pair of components having a DC value indicative of the phase of the demodulator output over the averaging time of the network by a sample and hold process. The DC component modulates the frequency of tone generator 11 to derive an output signal having a phase indicated by Equation (7). The phase of the output signal remains constant over the averaging time of network 25, i.e., over the sampling interval of the network. In the alternative, a narrow bandpass filter having a center frequency equal to the frequency of tone generator 11 can be employed. However, there are disadvantages to this approach as set forth supra.

Figure 4:
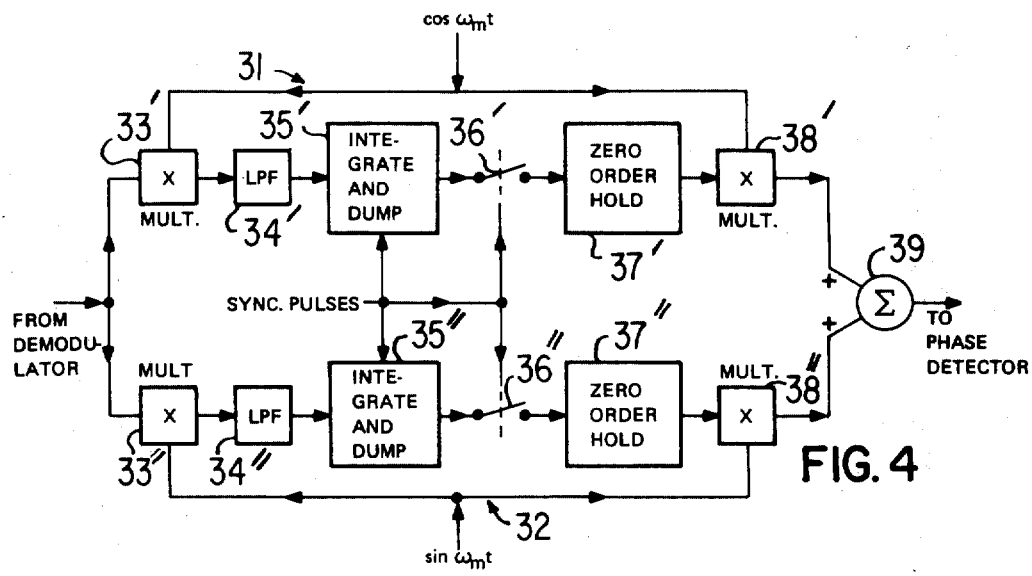
FIG. 4 is a block diagram of one embodiment of an averaging network adapted to be utilized in the system of FIG. 3.

One implementation of the preferred average modulation signal estimator is illustrated in FIG. 4 and includes a pair of orthogonal channels 31 and 32 driven by the output of demodulator 15. Channels 31 and 32 are responsive to orthogonal components of the output of tone generator 11, as respectively represented by cos $\omega_{mt}$ and sin $\omega_{mt}$. Since channels 31 and 32 are identical, a description of channel 31 is sufficient for both and the elements of channels 31 and 32 are designated by reference numerals having prime and double prime, respectively.

Channel 31 includes a multiplier or mixer 33 responsive to the output of demodulator 15 and the cos $\omega_{mt}$ signal, as derived from generator 11. Multiplier 33 derives a DC component having a magnitude that is proportional to the cosine of the phase angle between the inputs to multiplier 33, which component is passed through low pass filter 34, to the exclusion of any other components derived from the multiplier. The output signal of low pass filter 34 is applied to integrate and dump circuit 35, the output of which is periodically coupled through switch 36 to zero order hold network 37. Integrate and dump circuit 35 and switch 36 are responsive to synchronization pulses having a spacing equal to the averaging time of network 25. The synchronization pulses cause switch 36 to be momentarily closed, whereby the signal in integrator 35 is fed to hold or storage network 37 upon the completion of each integration or averaging interval. Immediately after switch 36 has been open, an integration capacitor in integrator 35 is short circuited and a new averaging cycle commences. Thereby, zero order hold network 37' derives a DC output signal over the averaging period of network 25 that is commensurate with the average phase displacement between the output of demodulator 15 and the cos $\omega_{mt}$ term over the previous averaging cycle of the network. Similarly, zero order hold network 37'' of channel 32 derives a DC signal having a magnitude indicative of the average phase displacement between the output of demodulator 15 and the sin $\omega_{mt}$ component over the averaging interval of network 25.

To restore the frequency of tone generator 11 to the DC components stored in zero order hold networks 37' and 37'', multipliers 38' and 38'' are respectively responsive to the cos $\omega_t$ and sin $\omega_t$ components, as well as the outputs of zero order hold networks 37. The resulting variable amplitude and orthogonally phased components derived from multipliers 38 are linearly combined in summing network 39, the output of which is applied to phase detector 16.

Figure 5:
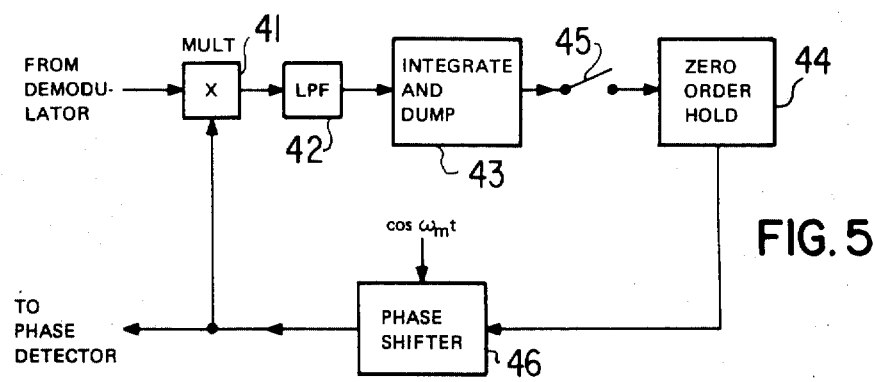
FIG. 5 is a block diagram of a second embodiment of the averaging device adapted to be utilized in the system of FIG. 3.

A further implementation of the average modulation signal estimator is illustrated in FIG. 5 wherein only a single channel is provided in combination with a feedback loop.

In particular, multiplier 41 is responsive to the output of demodulator 15 and a feedback signal which is also coupled to demodulator 16. The feedback signal has a frequency $\omega_m$ with a variable phase displacement commensurate with the average phase of the output of demodulator 15 over the averaging interval of network 25. The output of multiplier 41 thereby includes a DC component having an amplitude indicative of the phase displacement between the two inputs to the multiplier. The DC output of multiplier 41 is passed by low pass filter 42, to the exclusion of any other components derived from the multiplier. The output of low pass filter 42 is applied to integrate and dump network 43 which periodically drives zero order hold network 44 through switch 45. Integrate and dump network 43 and switch 45 are periodically activated in the manner described supra with regard to the integrate and dump networks 35 and switches 36 of FIG. 4. Thereby, zero order hold network 44 derives a constant amplitude DC signal indicative of the average phase of the output of demodulator 15 over the averaging interval of network 25.

The DC output of zero order hold network 44 is applied as a control input to phase shifter 46 that is also responsive to one component (cos $\omega_{mt}$) of generator 11. Phase shifter 46 derives an output signal having a constant angular frequency $\omega_m$ and a variable phase equal to the average phase of the output of demodulator 15 over the previous averaging interval of network 25. The output signal of phase shifter 46 is applied in parallel to multiplier 41 and to phase detector 16.

While there have been described and illustrated several specific embodiments of the invention, it will be clear that variations in the details of the embodiments specifically illustrated and described may be made without departing from the true spirit and scope of the invention as defined in the appended claims. In particular, to resolve possible range ambiguities resulting from a repetition of the phase position of the return from diverse ranges, plural tone frequencies can simultaneously modulate the transmitted carrier. In such an event, there are provided a plurality of averaging networks 25, each of which drives a separate phase detector 16. All of the averaging networks are driven in parallel by the output of demodulator 15. Each combination of an averaging network and a phase detector is responsive to a different tone frequency. The $\phi_m$ signals derived from the plural phase detectors are combined to obtain an unambiguous range indication.

What is claimed is:

1. A CW FM TR radar receiver responsive to a local tone modulation source and a return signal having a carrier frequency modulated by the tone comprising an FM demodulator responsive to the return signal for deriving a demodulated signal containing the tone frequency as a component thereof, means for averaging the phase of the tone frequency component of the demodulated signal, and means for comparing the averaged phase of the tone frequency component and the phase of the tone of the local modulation source.

2. The apparatus of claim 1 wherein the means for averaging includes means for deriving an output signal having a frequency equal to the frequency of the modulation tone and a phase equal to the average phase of the return signal over many cycles of the tone, said output signal being applied to the phase comparing means.

3. The apparatus of claim 2 wherein the means for averaging includes means for deriving a DC component indicative of the average phase over an averaging interval of the means for averaging, and means for controlling the tone frequency phase of the output signal in response to said DC component.

4. The apparatus of claim 3 wherein the means for deriving includes means for comparing the phase of the demodulated signal with a locally derived source of the tone frequency, means for integrating the DC component over the averaging interval, and means for sampling the integrated DC component at the end of the interval and for holding the sampled component during the next interval.

5. The apparatus of claim 4 wherein the means for deriving includes a pair of parallel channels driven in parallel by the demodulated signal, said channels being responsive to orthogonal components of the local tone frequency source, each of said channels including the phase comparing means, integrating means and sampling and holding means to thereby derive a separate integrated DC component indicative of the phase of the demodulated signal relative to one of the orthogonal components, and means for linearly combining the two separate integrated DC components to derive the output signal.

6. The apparatus of claim 4 wherein the means for deriving includes a feedback loop for deriving the output signal, said feedback loop including: the means for integrating and the means for sampling and holding, as well as means for comparing the phases of the output and demodulated signals to derive the DC component, and means for shifting the phase of the locally derived tone frequency source in response to the integrated DC component derived from the sampling and holding means, said means to phase shifting deriving the output signal.

7. The apparatus of claim 1 wherein the means for averaging includes means for deriving a DC component indicative of the average phase over an averaging interval of the means for averaging, and means for controlling the tone frequency phase of the output signal in response to said DC component.

8. The apparatus of claim 7 wherein the means for deriving includes means for comparing the phase of the demodulated signal with a locally derived source of the tone frequency, means for integrating the DC component over the averaging interval, and means for sampling the integrated DC component at the end of the interval and for holding the sampled component during the next interval.

9. The apparatus of claim 8 wherein the means for deriving includes a pair of parallel channels driven in parallel by the demodulated signal, said channels being responsive to orthogonal components of the local tone frequency source, each of said channels including the phase comparing means, integrating means and sampling and holding means to thereby derive a separate integrated DC component indicative of the phase of the demodulated signal relative to one of the orthogonal components, and means for linearly combining the two separate integrated DC components to derive the output signal.

10. The apparatus of claim 8 wherein the means for deriving includes a feedback loop for deriving the output signal, said feedback loop including: the means for integrating and the means for sampling and holding, as well as means for comparing the phases of the output and demodulated signals to derive the DC component, and means for shifting the phase of the locally derived tone frequency source in response to the integrated DC component derived from the sampling and holding means, said means for phase shifting deriving the output signal.

* * * * *